(12) United States Patent
Kazar et al.

(10) Patent No.: US 9,170,953 B2
(45) Date of Patent: Oct. 27, 2015

(54) SYSTEM AND METHOD FOR STORING DATA IN CLUSTERS LOCATED REMOTELY FROM EACH OTHER

(75) Inventors: Michael L. Kazar, Pittsburgh, PA (US); John R. Boyles, Cranberry Township, PA (US)

(73) Assignee: Avere Systems, Inc., Pittsburgh, PA (US)

( * ) Notice: Subject to any disclaimer, the term of this patent is extended or adjusted under 35 U.S.C. 154(b) by 0 days.

(21) Appl. No.: 13/481,464

(22) Filed: May 25, 2012

(65) Prior Publication Data

US 2012/0303737 A1 Nov. 29, 2012

Related U.S. Application Data

(63) Continuation-in-part of application No. 12/283,961, filed on Sep. 18, 2008.

(51) Int. Cl.
G06F 17/30 (2006.01)
G06F 12/08 (2006.01)
H04L 29/08 (2006.01)

(52) U.S. Cl.
CPC ........ *G06F 12/0866* (2013.01); *G06F 12/0815* (2013.01); *H04L 67/1097* (2013.01); *H04L 67/2842* (2013.01); *G06F 17/3071* (2013.01); *G06F 2212/264* (2013.01); *G06F 2212/284* (2013.01); *G06F 2212/314* (2013.01); *G06F 2212/463* (2013.01)

(58) Field of Classification Search
CPC .................................................. G06F 17/3071
USPC ........... 707/737, 781; 713/185, 375; 709/201, 709/217
See application file for complete search history.

(56) References Cited

U.S. PATENT DOCUMENTS

| | | | | |
|---|---|---|---|---|
| 5,634,122 A * | 5/1997 | Loucks et al. | ................. | 707/707 |
| 5,960,446 A * | 9/1999 | Schmuck et al. | ............. | 707/610 |
| 6,339,793 B1 * | 1/2002 | Bostian et al. | ................ | 709/229 |
| 7,418,500 B1 * | 8/2008 | Bolinger et al. | ............. | 709/225 |
| 7,617,292 B2 * | 11/2009 | Moore et al. | .................. | 709/216 |
| 2003/0028514 A1 * | 2/2003 | Lord et al. | ..................... | 707/707 |
| 2003/0078946 A1 * | 4/2003 | Costello et al. | ................ | 707/707 |
| 2004/0139125 A1 * | 7/2004 | Strassburg et al. | ........... | 707/707 |
| 2004/0250113 A1 * | 12/2004 | Beck | ............................. | 713/201 |
| 2005/0015384 A1 * | 1/2005 | Wehrman et al. | ............. | 707/707 |
| 2007/0143344 A1 * | 6/2007 | Luniewski et al. | ........... | 707/707 |
| 2009/0019047 A1 * | 1/2009 | Anderson et al. | ............. | 707/707 |
| 2009/0019098 A1 * | 1/2009 | Gunda et al. | .................. | 707/707 |
| 2009/0109959 A1 * | 4/2009 | Elliott et al. | ................... | 370/352 |
| 2010/0138569 A1 * | 6/2010 | Fuerst et al. | .................... | 710/36 |
| 2012/0036161 A1 * | 2/2012 | Lacapra et al. | ............... | 707/781 |

* cited by examiner

*Primary Examiner* — Robert Beausoliel, Jr.
*Assistant Examiner* — Alexandria Bromell
(74) *Attorney, Agent, or Firm* — Ansel M. Schwartz

(57) ABSTRACT

A system for storing data includes a plurality of clusters located remotely from each other in which the data is stored. Each cluster has a token server that controls access to the data with only one token server responsible for any piece of data. Each cluster has a plurality of Cache appliances. Each cluster has at least one backend file server in which the data is stored. The system includes a communication network through which the servers and appliances communicate with each other. A Cache Appliance cluster in which data is stored in back-end servers within each of a plurality of clusters located remotely from each other. A method for storing data.

15 Claims, 4 Drawing Sheets

SYSTEM AND METHOD FOR STORING DATA IN CLUSTERS LOCATED REMOTELY FROM EACH OTHER

CROSS-REFERENCE TO RELATED APPLICATIONS

This is a continuation-in-part of U.S. patent application Ser. No. 12/283,961 filed Sep. 18, 2008, incorporated by reference herein.

FIELD OF THE INVENTION

The present invention is related to a system for storing data having a plurality of clusters located remotely from each other in which the data is stored. (As used herein, references to the "present invention" or "invention" relate to exemplary embodiments and not necessarily to every embodiment encompassed by the appended claims.) More specifically, the present invention is related to a system for storing data having a plurality of clusters located remotely from each other in which the data is stored where each cluster has a token server that controls access to the data with only one token server responsible for any piece of data.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

This invention builds a geographically distributed cluster of cache appliances. Clustered cache appliances providing global cache consistency have existed for years, in systems such as the Andrew File System, the Open Software Foundation's Distributed File System (called DCE DFS) and NetApp's FlexCache system. However, these systems take a very restricted approach to managing network partitions, which this invention remedies. In addition, none of these systems allow write-back caching along with strict cache coherence in the presence of network partitions.

The Andrew File System, for example, only provides synchronization with other users when a file is closed. Furthermore, once the file is closed, the file is written back synchronously to the back-end server, implementing a write-through policy instead of a write-back policy. The DCE DFS file system essentially operates in the same manner, writing data through to the file server when a file is closed. The NetApp FlexCache system only operates in write-through mode and handles network partitions by waiting for the partition's repair.

This invention, on the other hand, allows strictly correct behavior even when operating in write-back mode, and even when a network partition occurs. Its default behavior in write-back mode is for partitioned users to wait for the network partition to be repaired, before being able to read the modified data. Other operational configurations allow partitioned users to read older versions of the data during a partition separating the partitioned users from the latest version of the data. Yet other write-back configurations are described as well.

BRIEF SUMMARY OF THE INVENTION

The present invention pertains to clustered file system cache appliances.

The present invention pertains to a system for storing data. The system comprises a plurality of clusters located remotely from each other in which the data is stored. Each cluster has a token server that controls access to the data with only one token server responsible for any piece of data. Each cluster has a plurality of Cache appliances. Each cluster has at least one backend file server in which the data is stored. The system comprises a communication network through which the servers and appliances communicate with each other.

In the following, systems comprised of multiple Cache Appliance Clusters are described. Each back-end file server is owned by a single Cache Appliance Cluster, whose Token Managers are responsible for synchronizing all accesses to files stored at that back-end file server. This cluster is called the home or base cluster for that back-end file server. Any other Cache Appliance Cluster that can access that file server is called a remote cluster with respect to that back-end file server. Accesses from a Cache Appliance Cluster are called local accesses if they access files stored in back-end file servers for which this Cache Appliance Cluster is the base cluster. They are called remote accesses if they are accessing files in a back-end file server having a base cluster differing from the accessing cluster.

The present invention pertains to a Cache Appliance cluster in which data is stored in back-end servers within each of a plurality of clusters located remotely from each other. The Cache Appliance cluster comprises one or more Cache appliances. The Cache Appliance cluster comprises one or more back-end file servers. The Cache Appliance cluster comprises one or more token servers which manage tokens for the data stored within the cluster's back-end file servers, with accesses to the data controlled by these token servers and no other token server of any other cluster. The Cache Appliance cluster comprises a configuration database which stores local virtual server definitions, which exports location services to remote clusters, and which associates a local file system export with a remote cluster's export.

The present invention pertains to a method for storing data. The method comprises the steps of receiving data at a plurality of clusters located remotely from each other. Each cluster has a token server that controls access to the data with only one token server responsible for any piece of data. Each cluster has a plurality of Cache appliances. The servers and appliances communicate with each other through a communication network. There is the step of storing the data at one or more backend file servers of each cluster.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
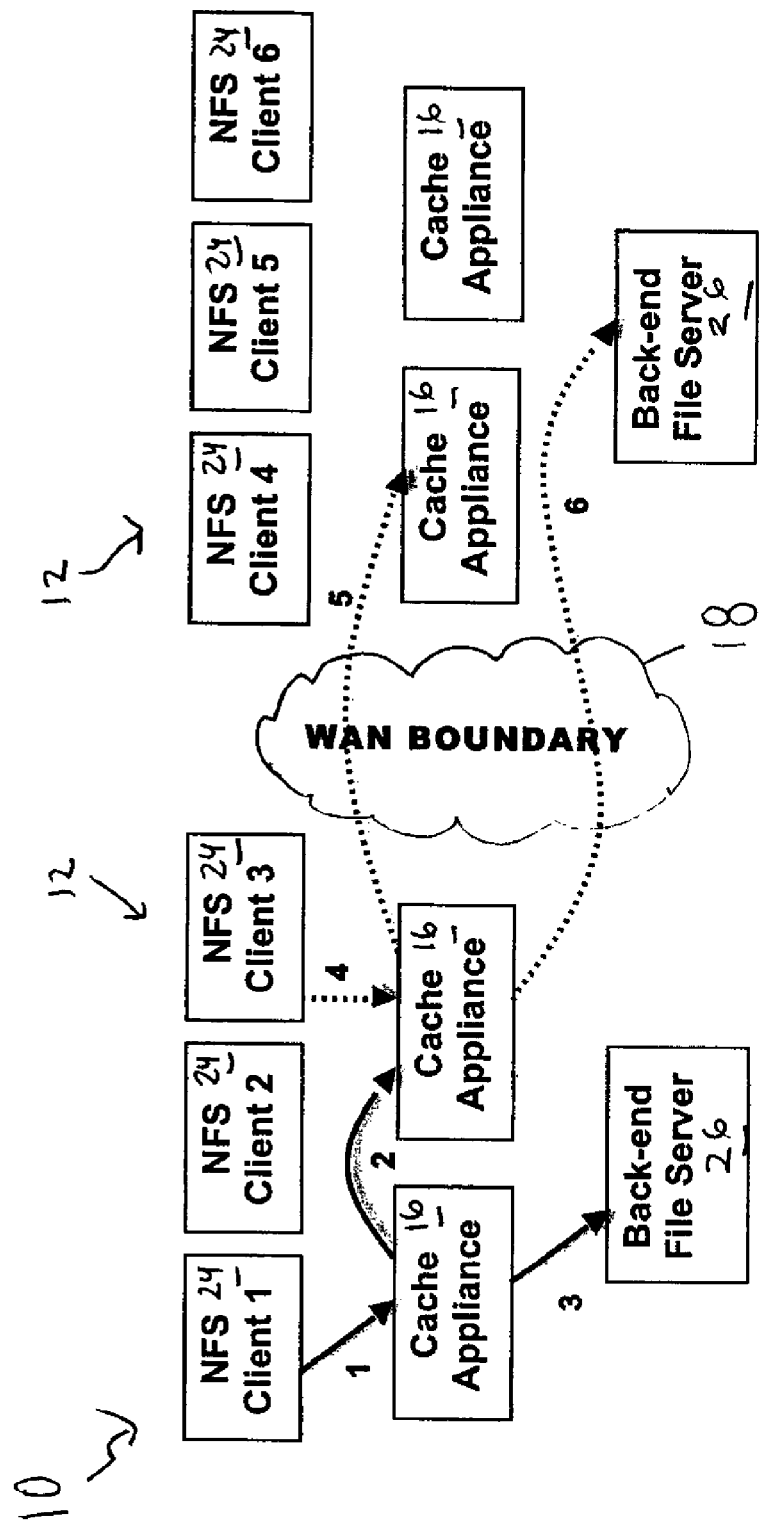
FIG. 1 is a block diagram of the present invention deployed in a WAN environment.
Figure 2:
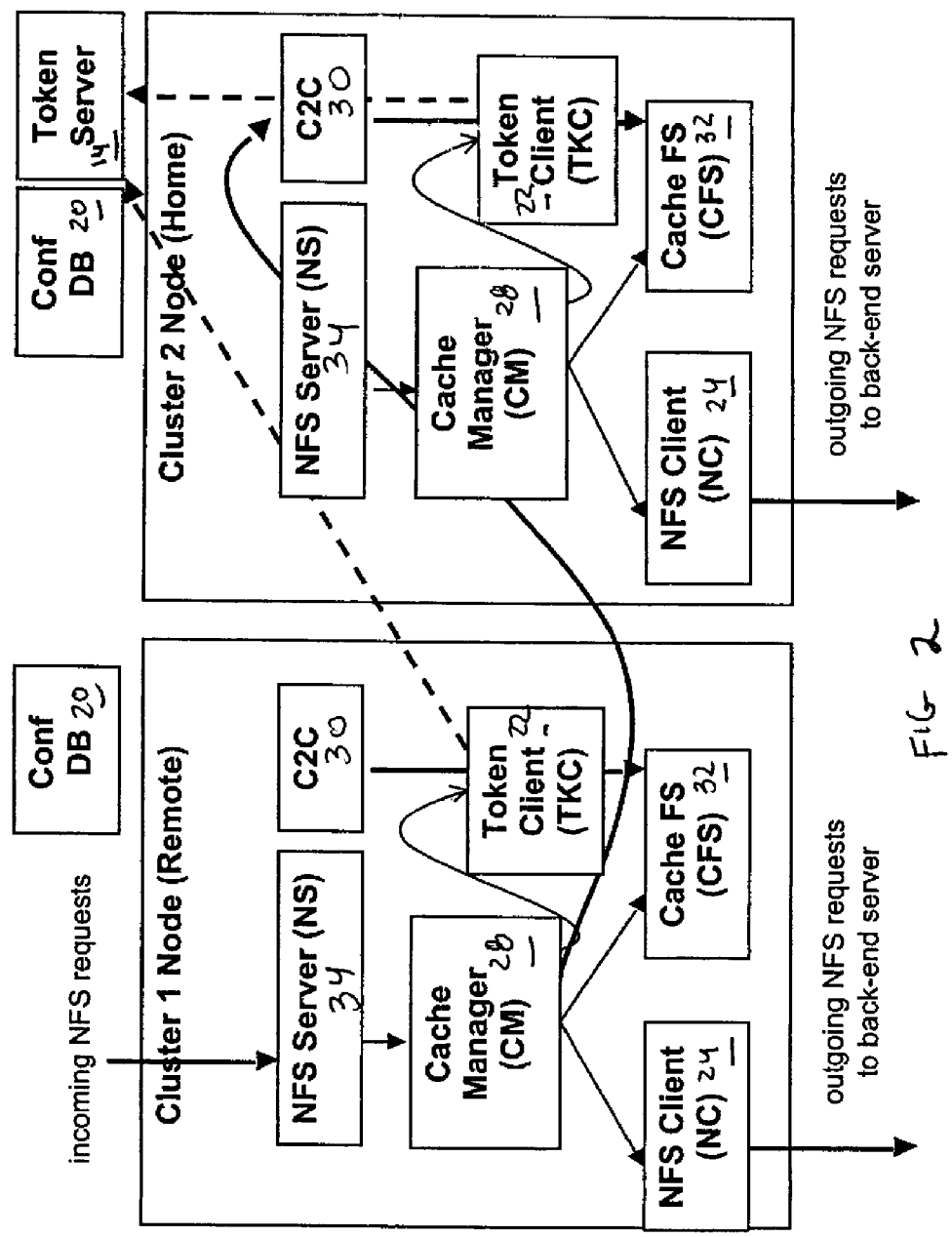
FIG. 2 is a block diagram of two clusters of the present invention.
Figure 3:
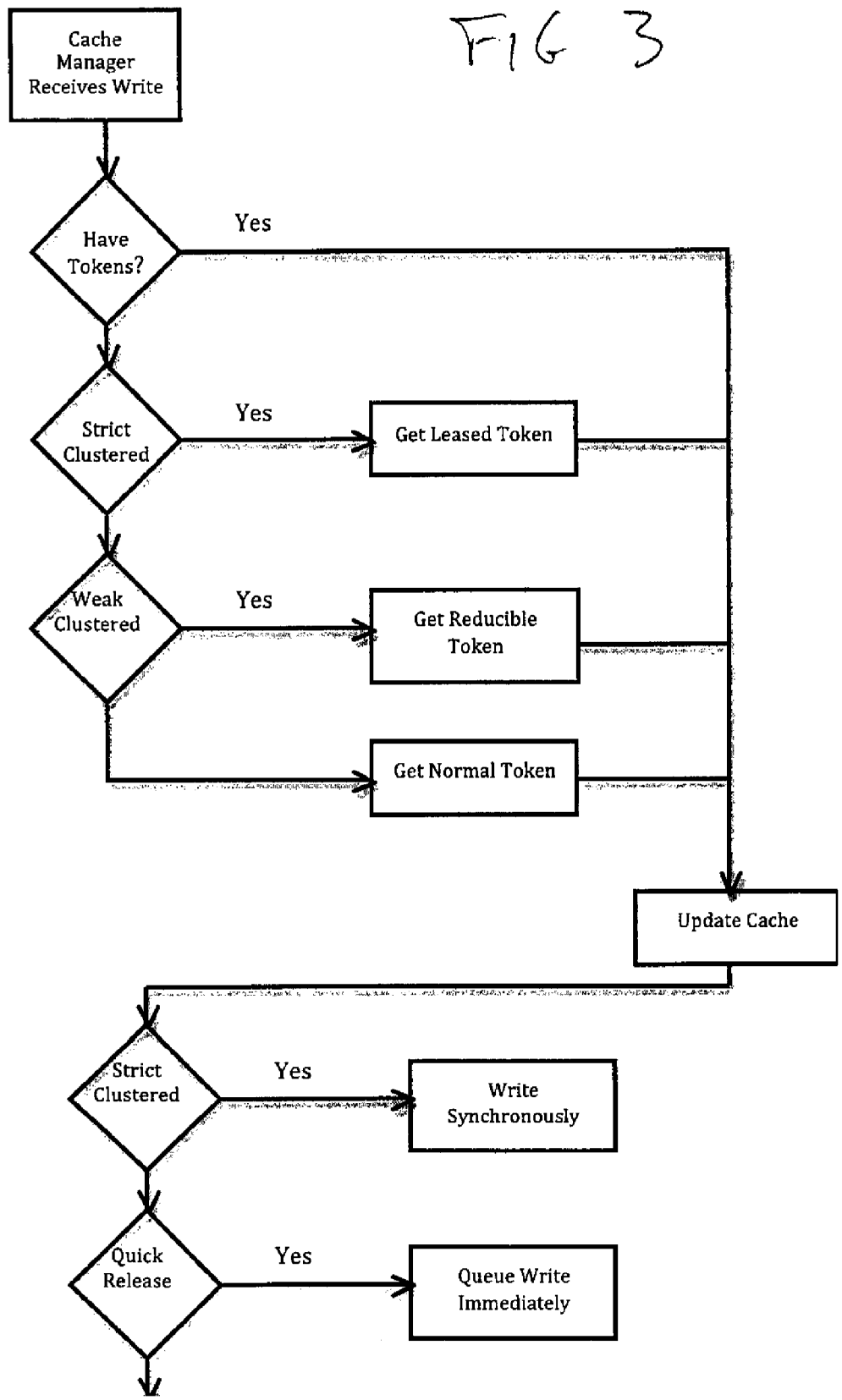
FIG. 3 is a flow chart regarding a write call.

Referring now to the drawings wherein like reference numerals refer to similar or identical parts throughout the several views, and more specifically to FIGS. 1 and 2 thereof, there is shown a system 10 for storing data. The system 10 comprises a plurality of clusters 12 located remotely from each other in which the data is stored. Each cluster 12 has a token server 14 that controls access to the data with only one token server 14 responsible for any piece of data. Each cluster 12 has a plurality of Cache appliances 16. Each cluster 12 has at least one backend file server 26 in which the data is stored. The system 10 comprises a communication network 18 through which the servers and appliances communicate with each other.

Each cluster 12 may include a configuration module 20 for managing configuration information of the cluster 12. Each Cache appliance 16 may include a token client module 22 which handles obtaining tokens from multiple clusters 12. Each Cache appliance 16 may include an NFS client module 24 which sends calls to a backend file server 26 in any of the clusters 12 in the network. Each Cache appliance 16 may include a Cache manager module 28 which executes a request by obtaining tokens from the token server 14 and accessing Cache attributes and Cache data.

Each Cache appliance 16 may include a Cache-to-Cache (C2C) server module 30 that handles requests from Cache managers of other Cache appliances for data stored in a back-end server associated with any Cache appliance cluster 12. Each Cache appliance 16 may include a CFS module 32 for storing cached data persistently at the Cache appliance 16. Each Cache appliance 16 may include an NFS server module 34 which receives incoming NFS requests for a specific exported file system 10 from any cluster 12. Each Cache appliance 16 may obtain Leased Write Tokens when getting tokens to perform write operations to data stored at a remote cluster's back-end file server.

Each Cache appliance 16 may obtain Reducible Write Tokens when getting tokens to perform write operations to data stored at a remote cluster's back-end file server. Each Cache appliance 16 may obtain non-leased Persistent Write Tokens when writing data located at back-end file servers of remote clusters 12, and where the Cache appliance 16 writes the data back asynchronously to the back-end file server from which the data was originally obtained. The Cache appliance 16 may operate in write-through mode. The choice of which type of write tokens to obtain for data stored in a remote cluster 12 may be determined by a setting in the configuration module 20.

Each type of server and the Cache appliance identified herein comprises a processor, a network interface unit to communicate with the network, and a non-transitory memory.

The present invention pertains to a Cache appliance 16 cluster 12 in which data is stored in back-end servers within each of a plurality of clusters 12 located remotely from each other. The Cache appliance 16 cluster 12 comprises one or more Cache appliances 16. The Cache appliance 16 cluster 12 comprises one or more back-end file servers. The Cache appliance 16 cluster 12 comprises one or more token servers 14 which manage tokens for the cluster's data, with accesses to the data controlled by these token servers 14 and no other token server 14 of any other cluster 12. The Cache appliance 16 cluster 12 comprises a configuration database which stores local virtual server definitions, which exports location services to remote clusters 12, and which associates a local file system 10 export with a remote cluster's export.

The present invention pertains to a method for storing data. The method comprises the steps of receiving data at a plurality of clusters 12 located remotely from each other. Each cluster 12 has a token server 14 that controls access to the data with only one token server 14 responsible for any piece of data. Each cluster 12 has a plurality of Cache appliances 16. The servers and appliances communicate with each other through a communication network 18. There is the step of storing the data at one or more backend file servers 26 of each cluster 12.

There may be the step of managing configuration information of the cluster 12 with a configuration module 20 of each cluster 12. There may be the step of obtaining tokens from multiple clusters 12 from the token client module 22 of the Cache appliances 16 performing the operation. There may be the step of sending calls to a backend file server 26 in any of the clusters 12 in the network from an NFS client module 24 of a Cache appliance 16.

The present invention is related to a set of clustered cache appliances 16, able to span a wide area network, but which provide the same file synchronization semantics as a single NFS file server. U.S. patent application Ser. No. 12/283,961 titled "File Storage System, Cache Appliance, and Method," incorporated by reference herein, from which this application is a continuation-in-part, provided a mechanism for caching modified data in a safe manner, guaranteeing that modified data stored anywhere in the cluster 12 will survive any combination of node crashes, and will be supplied to any user who reads data from any node at any time after it is written. This is accomplished via a mechanism called Persistent Tokens, which are a form of write lock that is guaranteed to be stable (and replicated in high-availability configurations) with respect to node crashes, and which record which nodes potentially store modified data. When operating in a wide-area network (WAN) environment, however, this mechanism has some negative characteristics.

Most significantly, if a cluster 12 of cache appliances 16 is partitioned because of problems with the WAN links, then persistent write tokens held by a node on a different side of the partition than the Token server 14 controlling that token will be irrevocable. The persistent write tokens cannot be unilaterally revoked because their existence allows the node to hold modified data, and the tokens cannot be revoked until the modified data has been written back to the server; this write-back operation is impossible during a WAN partition. Even if a lease mechanism existed so that the token could be revoked, that mechanism could not be utilized for the previous invention's write tokens, since those tokens grant the right to hold modified data in the node's cache, and any node reading that same data may need to access the modified data in the partitioned node's cache. This invention provides a solution to these issues.

This invention adds several new families of write tokens. Each token family includes an attribute token applying to an entire file, and includes a data range token applying to a byte range of a file.

First, this invention provides a Leased Write Token that conflicts with other read and write tokens, but which does not grant the holder of the token the ability to hold modified data in its cache. When a Leased Write Token is held, if a network partition occurs, a lease expiration forces a revoke of the Leased Token; this can be done safely since any modified data has been already written to the back-end server. With this modification, tokens can be granted to a node across a WAN link, and can be unilaterally by the Token server 14 in case of a WAN partition. Of course, Leased Tokens must be used along with write-through mode, so that there can be no modified data on the far side of a broken WAN link.

This invention also provides an option of using a Reducible Write Token instead of a Leased Write Token to protect data being written. A Reducible Write Token conflicts with other read and write tokens, and also grants the holder of the token the ability to hold modified data without writing it back, and is also leased. Upon expiration of the lease, a Reducible Write Token turns into a Read with Modified Token that no longer allows new write operations to be performed, and which allows read tokens to be simultaneously granted. This mechanism is used to allow, at the system 10 administrator's option, other users to read stale data that was modified at a remote cluster 12.

The use of these tokens allows three new operating modes. The first, Strict Clustered mode, requires remote nodes to be in write-through mode. Upon network partition, all modified data has already been stored back at the data's home cluster 12, and thus the home cluster 12 can grant any type of token to the data modified remotely. In this model, no stale data is ever read, and all data can be read or written at its home cluster 12 after the expiration of a lease timeout.

The second, Weak Clustered mode, grants Reducible Write tokens instead of Leased Write tokens to the Cache Managers in remote Cache Appliances 16. This allows remote nodes to operate in write-back mode instead of write-through mode, although we would expect that the time before data is written back to the backing file servers would be configured to be very low. If a network partition between the Cache appliance 16 and the back-end file server occurs between the time that data is modified and data is written back to the back-end server, the Reducible Write token is reduced to a Read with Modified token, allowing concurrent readers in the part of the cluster 12 still connected to the export's home cluster 12 to read stale data for the updated file until the partition is repaired.

The third, Quick Release mode, grants normal write tokens, even to Cache appliance 16 nodes in remote clusters 12. This allows remote nodes to operate in write-back mode instead of write-around mode, and prevents any chance of reading stale data from the data's home cluster 12, even in the event of a network partition. If the remote node holding the normal write token fails, or is partitioned from the data's home cluster 12, the data is no longer accessible for either reading or writing from the home cluster 12. To minimize the likelihood of this happening, modified data at a remote cluster 12 is written back very aggressively, but asynchronously, to the back-end file server, using a short timer on the Cache appliance 16 to write back the modified data and return the normal write attribute and write data tokens to the home cluster's Token server 14 within a few seconds or even milliseconds of the time that the data is last modified at the remote cluster 12.

In order to achieve maximum independence between the geographically distributed cache clusters, each cache appliance 16 cluster 12 operates independently except when getting tokens to a jointly accessed back-end file server, and the related infrastructure. FIG. 1 illustrates how this invention is meant to be deployed in a WAN environment.

With this design, a cluster 12 of cache appliances 16 and an associated set of back-end file servers can each be located across a number of distinct geographical locations, with each cluster 12 of cache appliances 16 caching data from its own local file servers as well as file servers located at remote locations. Updates made to the remotely located file servers may be written back to the back-end server in a different manner than when accessing files in the local cluster 12, depending upon the operating mode, since Strict Clustered mode requires writing data back to remote clusters synchronously, and the other modes require writing data back to the remote servers relatively aggressively.

In more detail, FIG. 1 shows two linked clusters 12, each with two Cache Appliances, and three NFS clients directly connected to the Cache Appliances 16. Within each cluster 12, the Cache Appliances 16 are managing tokens for a single back-end file server local to that cluster 12.

First, there is described a reference to a local back-end file server on the left side of the WAN boundary. NFS Client 1 accesses a file (request "1") via one Cache appliance 16. That Cache appliance 16 makes a call (request "2") to the Token server 14 for the requested file, which happens to be running on the other Cache appliance 16 in the left side Cache appliance 16 cluster 12. Once the required tokens have been obtained, the Cache appliance 16 calls the back-end file server (request "3") to actually perform the desired operation.

Next, there is described a reference to a remote back-end file server. The initial reference in this example comes from NFS Client 3 (request "4") and is received by a Cache appliance 16 in the left side cluster 12. However, in this case, the request is for a file in an export provided by the back-end file server in the right side cluster 12. Token management for file server in the right hand cluster 12 is provided by Token Servers 14 in that same cluster 12, so the Cache appliance 16 in the left cluster 12 calls a Token server 14 in the right cluster 12 (request "5") to obtain the required tokens. Once they have been obtained, the Cache appliance 16 in the left cluster 12 calls directly to the back-end file server in the right cluster 12 (request "6") to perform the desired request.

In the operation of the invention, this invention is implemented as an extension to U.S. patent application Ser. No. 12/283,961. In this invention, a configuration database records the definition of virtual servers, both local to the Cache appliance 16 Cluster and those defined in remote Cache appliance 16 Clusters as well. A virtual server is comprised of a back-end file server, and the set of file system 10 exports it provides, along with a set of IP addresses at which the Cache appliance 16 Cluster can be contacted to see a cached version of those exported file systems.

A configuration database, a component of each Cache appliance 16 Cluster, records several pieces of information. It records the local virtual server definitions, and the remote virtual server definitions linked to from a different Cache appliance 16 Cluster. In the definition of a remote virtual server, the configuration database also stores the address at which the remote Cache appliance 16 Cluster's configuration database can be reached.

The configuration database also records the existence of multiple Token Servers 14 for the local Cache appliance 16 Cluster, and a mapping for each Token server 14 to the node in the Cache appliance 16 Cluster that is currently hosting that Token server 14. Each node in the Cache appliance 16 Cluster maintains an in-memory copy of this mapping. Given an incoming file handle for a specific export, each node can simply select the set of Token Servers 14 associated with the export's Cache appliance 16 Cluster, and then compute a hash of the incoming file handle to use to select a specific Token server 14 in the export's cluster 12. The export's cluster's configuration database then provides the specific node address at which the desired Token server 14 can be accessed.

The Token Client is modified to utilize this more complex mapping to determine the Token server 14 to be used for synchronizing Cache Manager operations. Instead of simply hashing the incoming file handle to determine the Token server 14 to invoke, and then consulting the Token server 14 to address mapping to find the node at which to contact that Token server 14, in the Linked Cluster environment an additional step is added. In the new system 10, the Token Client is additionally passed the export being accessed by the NAS request being executed, and the token client uses the export to determine which Cache appliance 16 Cluster stores the file being accessed. Given this cluster 12, the Token Client then selects a cluster-specific set of Token Servers 14, and as before, based on a hash of the incoming file handle, selects a specific Token server 14. It finally consults the export's home cluster's configuration database to determine which node is running that Token server 14 at the moment, and contacts the Token server 14 at that address.

Two requests are now described, one to a local file server and one to a remote one, with reference to FIG. 2. FIG. 2 shows two linked clusters, each with two Cache Appliances, and three NFS clients directly connected to the Cache Appliances 16. Within each cluster 12, the Cache Appliances 16 are managing tokens for a single back-end file server.

First, there is described a reference to a local back-end file server on the left side of the WAN boundary. NFS Client 1 accesses a file (request "1") via one Cache appliance 16. That Cache appliance 16 makes a call (request "2") to the Token server 14 for the requested file, which in this example is running on the other Cache appliance 16 in the left side Cache appliance 16 cluster 12. Once the required tokens have been obtained, the Cache appliance 16 calls the back-end file server (request "3") to actually perform the desired operation.

Next, there is described a reference to a remote back-end file server. The initial reference in this example comes from NFS Client 3 (request "4") and is received by a Cache appliance 16 in the left side cluster 12. However, in this case, the request is for a file in an export provided by the back-end file server in the right side cluster 12. Token management for file server in the right hand cluster 12 is provided by Token Servers 14 in that same cluster 12, so the Cache appliance 16 in the left cluster 12 calls a Token server 14 in the right cluster 12 (request "5") to obtain the required tokens. Once they have been obtained, the Cache appliance 16 in the left cluster 12 calls directly to the back-end file server in the right cluster 12 (request "6") to perform the desired request.

A detailed description of the operation of the invention includes both a block diagram description plus walkthroughs of some common operations.

The description begins with the key modules involved in the processing of accesses to files in a remote Cache appliance 16 Cluster 12. Next, there is a walkthrough of a remote request, showing the processing of the incoming file handle, how it is mapped to an export in the data's home cluster 12, and how that request is processed by both the remote cluster 12 receiving the request and the home cluster 12 providing token management for its back-end file server.

The NFS protocol operates on files described by file handles, and the Cache Appliances 16 described here augment the file handles provided by the back-end file servers with an export ID identifying the back-end file server, and the export within that back-end file server, that provided that file handle. Based on the export ID, a Cache appliance 16 can determine the IP address or addresses at which to contact the back-end file server, as well as the addresses at which to contact the Cache appliance 16 Cluster's ConfDB and thus its Token server 14 synchronizing access to the referenced files.

A cluster 12 of Cache Appliances 16 treats the exports from a given back-end file server as a single collection, called a virtual server, or vserver. A virtual server consists of a range of IP addresses on the Cache appliance 16 at which the all of the exports from a specific back-end file server can be accessed. A single Cache appliance 16 typically has one virtual server for each back-end file server for which the Appliances acts as a cache.

In this invention, each back-end file server has a home or base cluster 12, typically the cluster 12 of Cache Appliances 16 closest geographically to the back-end file server. Other clusters can also access the data stored at the back-end file server, and these are called remote clusters, with respect to the specific back-end file server.

The Configuration Database, or ConfDB, stores a number of key pieces of cluster-wide information. First, it stores each virtual server definition, including the export IDs included in outgoing file handles from the Cache appliance 16 to its users, the server name of the back-end file server associated with this vserver, the cluster name of the Cache appliance 16 cluster associated with the back-end file server, and the set of IP addresses associated with the virtual server, at which the virtual server's exports can be accessed on the Cache appliance 16. The vservers described in the ConfDB include the local cluster's vservers and a cached copy of the vserver definitions from the other home clusters with which our local cluster is sharing data.

Second, the ConfDB stores (other) base cluster definitions, specifically the name of the cluster 12, one or more IP addresses at which the cluster's ConfDB can be accessed, and a set of Token server 14 universal unique identifiers (UUID) representing the Token Servers at the base cluster 12. This information is used to generate the local server's list of remote vservers.

Third, the ConfDB stores back-end server definitions, including the name of the server, and the base cluster 12 associated with the server.

Fourth, the ConfDB stores Cache appliance 16 node definitions, including the IP addresses at which it can be accessed for the local cluster 12.

Fifth, the ConfDB stores current location information for the local cluster's Token Servers. Each Token server 14 is assigned to a specific Cache appliance 16 node at any given instant, although this assignment may change from time to time during failovers.

The primary copy of some of this information in a remote cluster's ConfDB is actually a copy of the corresponding information in the base cluster's ConfDB. Specifically, the IP addresses associated with a base cluster's ConfDB, a base cluster's back-end virtual server definitions, the base cluster's node definitions, and finally the base cluster's Token server 14 definitions and their corresponding locations are all copies of the corresponding information from the base cluster.

The Token server 14 in a Cache Appliance Cluster manages, as in the previous invention, a set of locks, called, tokens, on the files at the back-end file servers associated with this cluster 12. In the original invention, these tokens can be obtained by any Token Client in the Cache appliance 16 Cluster, and the cluster's ConfDB keeps track of which Cache Appliance node is currently hosting a given Token Client. When a token is granted by the Token server 14, it stores the Token Client's client ID, which can be used to determine the current whereabouts of the token client, so that token revokes can be sent to the token client. In this invention, any token client in any cluster 12 can send a request to any Token server 14. Additionally, however, the Token server 14 keeps track of the Cache appliance 16 Cluster 12 associated with any incoming request's client ID so that if a token needs to be revoked, the Token server 14 can contact the remote cluster's ConfDB to determine the node currently responsible for the remote Client ID.

The Cache Manager is essentially unchanged from the previous invention. It receives file handles from exports whose token management is handled by Token Servers in one or more Cache Appliance Clusters, but the Cache Manager itself (as opposed to the Token Client) does not change its behavior based on the cluster 12 in which a file handle resides.

The Token Client manages a set of client-side tokens from one or more Token servers 14. Tokens for a given file handle are obtained from a particular Token server 14, based on the file handle's export ID, which determines its Cache appliance 16 Cluster 12, and on a hash of the entire file handle, which gives the specific Token server 14 instance within that Cache Appliance Cluster that manages that file's tokens. Each Token Client has a Client ID, and its Cluster's ConfDB keeps track of which physical node is hosting that Token Client.

The NFS client module 24 provides the same functionality as in the previous invention, making calls to the back-end file servers in all of the linked Cache appliance 16 Clusters.

ConfDB Module

The ConfDB module provides a set of interfaces for managing configuration information for the cluster 12. It can be implemented simply using two-phase commit database techniques across all of the nodes in a particular cluster 12. Communication between nodes in a cluster 12 is performed using a simple Remote Procedure Call package, SunRPC over TCP/IP.

This module exports the following interfaces:

int32_t ConfDB::registerService(UUID serviceId, UUID nodeId)

This call registers the presence of a new Token server 14, or other service, identified by the unique identifier. The serviceID may identify any service, including another node's ConfDB, a Token server 14, or a Token Client.

int32_t ConfDB::lookupService(UUID serviceId, UUID *nodeIdp)

This call returns the configuration database entry created by registerService for the serviceId, telling what node is currently executing the specified service.

---
int32_t ConfDB::registerNodeLocation(UUID nodeId,
    struct sockaddr *sockAddrp)
---

This call registers the network address at which the specified node can be found.

---
int32_t ConfDB::lookupNodeLocation(UID nodeId,
    struct sockaddr *sockAddrp)
---

This call returns the addressing information used to reach the specified node.

---
static int32_t ConfDB::initRemoteCluster(
    char *clusterNamep, struct sockaddr *sockAddrp[ ],
    ConfDB **confDbpp)
---

This call registers a remote cluster's identity and a set of addresses at which its ConfDB service may be reached. This is used to initialize ConfDB objects corresponding to other clusters, so that their database may be consulted as well. The newly initialized ConfDB object is also put into a static table indexed by name. The newly created ConfDB object is returned in *confDBpp.

---
static int32_t ConfDB::lookupRemoteCluster(
    char *clusterNamep,
    ConfDB **remoteConfDBpp)
---

This call searches the static table for a ConfDB object registered for a cluster with name clusterNamep, and returns it in *remoteConfDBpp. This object can be used in further ConfDB module calls.

Token Server 14 Module

This module is described in the original invention, and operates nearly unchanged from that invention.

This module receives request to grant tokens on behalf of ClientIds that are associated with specific nodes, and we augment these calls to also provide the identity of the Cache appliance 16 Cluster with which this ClientId is associated. This additional information is stored along with the token in the Token server 14, for use when the token is revoked. This ClientId field is treated as a service to the ConfDB, and can be located by calling the remote ConfDB's lookupService call.

When a token must be revoked, the Token server 14 contacts the ClientId's ConfDB to locate the node currently responsible for the set of tokens held by that ClientId, and sends the revoke message to that node. The only difference between the behavior in this invention and in the previous invention is that the previous invention had only one ConfDB in its domain, and so always looked up the ClientId's node with that single ConfDB instance. But this invention has multiple clusters and so must send the ClientId lookup request to the ConfDB at the cluster associated with the ClientId owning the token.

The Token server 14 also must implement the new tokens described above. One of these tokens is a Leased Write token, used by nodes in a remote cluster 12 when accessing data in a file server in a base cluster 12. Leased Write Tokens are associated with a lease, so that if the write token cannot be revoked due to, say, a network partition, it disappears after the lease expires. For the data to remain consistent in the presence of Leased Write tokens, the data needs to be written through to the back-end file server; otherwise someone who gets a Read token after a Leased Write token expires would still not be able to read the latest version of the protected data. Another new token type is the Reducible Write token, which is a persistent leased write token that turns into a persistent Read with Modified token should its lease expire. A Read with Modified token is implemented identically to a normal read token, except that it is persistently recorded, and grants the owner the right to hold modified data in its cache, even though that node can no longer continue to make modifications to the data covered by the Read with Modified token.

Token Client Module 22

The Token Client is extended in this invention to handle obtaining tokens from multiple clusters. It already handles obtaining tokens from multiple Token Servers 14 within a single cluster 12, but the Token server 14 locations are all obtained from the single cluster's ConfDB server. In this latest invention, the Token Client needs to determine the Token server 14 locations first by determining the ConfDB instance to call based on the cluster 12 determined from the ExportId of the incoming file handle, and then hashing the incoming file handle to determine which Token Manager service needs to be invoked. The Token Client calls the appropriate cluster's ConfDB::lookupService to determine where the Token server 14 services are currently executing on the remote cluster 12, and invokes the appropriate Token server 14 based upon the hashed incoming file handle.

NFS Client Module 24

The NFS client module 24 is invoked to send calls to a back-end file server. In the base invention, the back-end file server to invoke is determined based on the ExportId, and that same procedure determines the correct back-end file server in this new invention as well.

Cache Manager Module 28

The Cache manager module 28 is responsible for executing the incoming request by first obtaining tokens from the Token server 14, then accessing cached attributes and cached data, and possibly calling the back-end file server to handle cache misses or synchronous write-backs.

This module is modified for this invention in several straightforward ways.

First, when accessing a file handle associated with an export with a different base cluster 12, the Cache Manager does its updates in write-through mode if the operating mode is Strict Clustered and an export in a remote cluster 12 is being accessed, so that if a network partition occurs between clusters, all modified data is safely present on the back-end file server. On the other hand, if the data being accessed resides in a remote cluster 12, and the operating mode is Quick Release, then the updated data is aggressively written back to the back-end file server to minimize the time during which a network partition results in an inaccessible file. In any operating mode, we can easily determine whether data is being accessed from a remote cluster 12 by looking up the properties of the ExportID in the file handle being processed by any operation.

Second, when requesting data or attribute write tokens for a file with a different home cluster 12, then if Cache Manager is operating in Strict Clustered mode, it asks for a Leased Write token instead of a normal Write Data token. When requesting data or attribute write tokens from a remote cluster 12 when in the Weak Clustered operating mode, the Cache Manager requests a Reducible Write token, which turns into a Read with Modified token upon its lease expiration. In general, Leased tokens can be revoked or downgraded unilaterally by the Token server 14 in the event of a network partition between the Token server 14 and the Token Client in the remote cluster 12. Once the Leased Write Token has been revoked after its expiration, or a Reducible Write Token has been downgraded to a Read with Modified Token, conflicting tokens can be granted to other nodes in clusters that remain connected to the file's home cluster 12.

C2C Module 30

The Cache-to-Cache (C2C) module 30 is responsible for handling requests from Cache Managers on other nodes for data stored in the local node's cache. The token manager can grant a type of token called an Ownership token that gives a node the right to hold a more recent version of the data than is stored at the back-end file server. When an Ownership token is outstanding, requests to read or write attributes or data must be sent to the C2C server on the node holding the Ownership token. That node will satisfy the requests from its own cache, if valid, or by reading the relevant data from the back-end file server first, and then handling the incoming request.

In this invention, Ownership tokens are restricted to being granted to Token Clients in a file's home cluster 12. Thus, processing C2C operations works in this invention in the same way as in the previous invention.

CFS Module 32

The CFS module 32 is responsible for storing cached data persistently in a Cache appliance 16 node. Its behavior is unchanged between the previous invention and the invention described here.

NFS Server Module 34

The NFS Server receives incoming NFS requests for specific exported file system 10, as in the previous invention. In this invention, however, each export is associated with a specific cluster 12, which may be the local cluster 12 or a remote cluster 12.

The NFS Server passes the identity of the export from which the incoming operation was received as a parameter to the Cache Manager calls invoked to handle the incoming NFS operation. If the export designates a file system 10 on a filer in a remote cluster 12, the Cache Manager's operation will be changed in the manner described above. Specifically, it will obtain its required tokens from the Token server 14 located at the remote cluster 12 instead of the local cluster 12. In addition, depending upon its operating mode, it may request Leased Write tokens or Reducible Write tokens instead of normal write tokens when accessing data in a remote cluster 12, and may write back data, and return tokens, more aggressively than in the local cluster 12 case.

In other regards, the behavior of the NFS Server is the same as the behavior of the NFS server module 34 in the previous invention.

Sample Operations

The following section walks through an NFS write operation running on a remote cluster 12 as it access data in a different home cluster 12, followed by a description of what happens during a network partition, followed by an NFS read operation from a different cluster 12, accessing the same file.

Initially, an NFS write operation is received by the NFS server with a file handle that describes the referenced file as associated with an export hosted at a remote cluster 12. The NFS write request is passed to the Cache Manager via a cm_write call. The cm_write call needs to obtain the proper tokens for performing the operation and the file's current attributes.

To do this, cm_write call invokes the Token Client to obtain the required tokens from the cluster 12 associated with the file's export. The Token Client determines the ConfDB instance associated with the cluster 12, and then invokes the Token server 14 in the remote cluster 12, getting data write and attribute write tokens for the file. Depending upon the operating mode, the specific type of tokens differ. In Strict Clustered mode, we obtain Leased tokens, in Weak Clustered mode we get Reducible tokens, and in Quick Release mode we get normal write tokens. The cm_write call then determines whether the data needs to be written back synchronously; since the cm_write operation is being performed at a remote cluster 12; it needs to be written synchronously if we are in Strict Clustered mode. If the data needs to be written back synchronously, cm_write also sends an NFS write operation to the remote cluster's back-end file server. In any case, the Cache Manager also updates its cache contents to track this update.

Once the write call completes, if a network partition occurs, system 10 behavior depends upon the operating mode. If the Cache appliance 16 is operating in Strict Clustered mode, then the write tokens are Leased tokens, and upon the lease timeout, the Cache appliance 16 in the remote cluster 12 discards its expired tokens, and the home cluster's Token server 14 can grant new read and write tokens to the file; this is safe because there is no modified data in the remote cluster 12. If the Cache appliance 16 is operating in Weak Clustered mode, the write token granted to the remote cluster 12 is a Reducible Write Token, and upon lease expiration it turns into a Read with Modified token. This allows the home cluster's token manager to grant new read tokens to any Cache appliances 16 accessing the data through the home cluster 12; attempts to obtain conflicting write tokens will fail. If the Cache appliance 16 is in the Quick Release operating mode, then if the token had already been returned, new read and write tokens can be granted to the same file, while if the partition occurred in the window between an update's being performed at the remote node and the return of the Write Token to the home cluster 12, all further requests to obtain read or write tokens at the home cluster 12 will fail.

Figure 4:
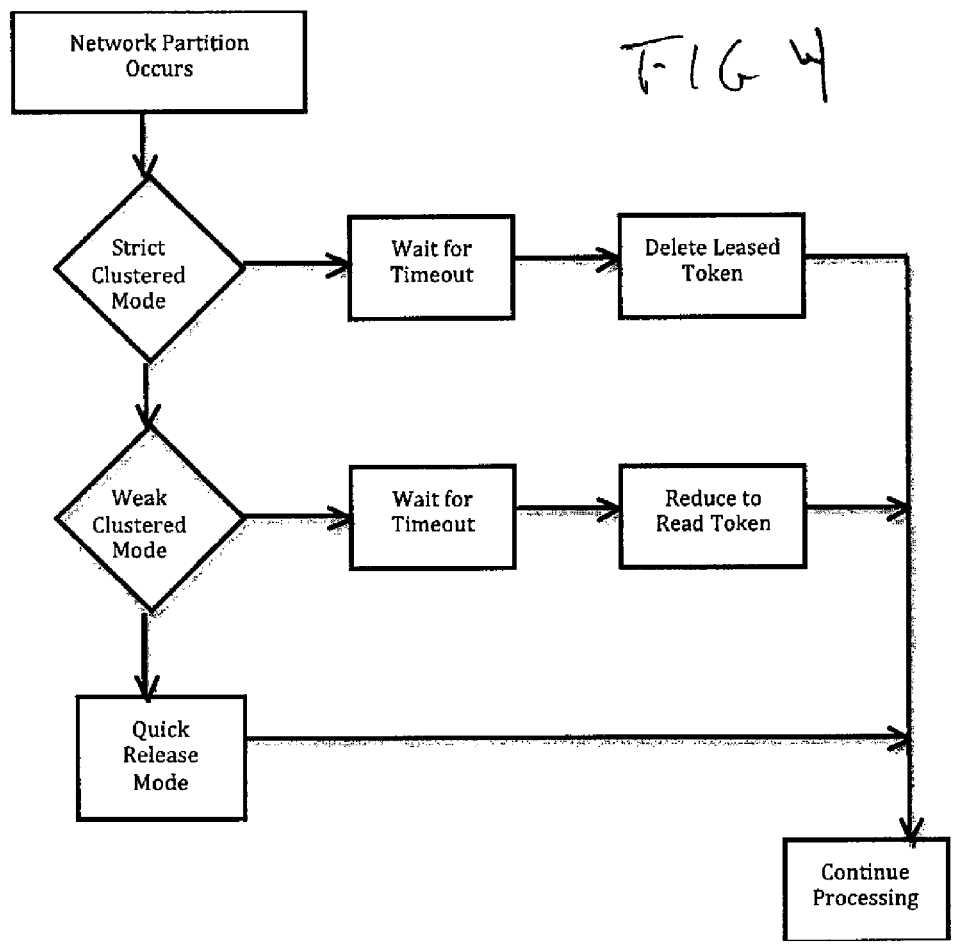
FIG. 4 is a flow chart regarding the process followed at a home cluster's token server upon a network partition.

FIG. 4 illustrates the process followed at the home cluster's token server upon a network partition.

If a cm_read operation is performed at this point, with the network still partitioned, in the Strict Clustered mode, the read will read the latest data without any problem, since the latest data is correctly stored at the data's home cluster 12. If the cm_read operation is performed in Weak Clustered mode, the read operation will also succeed immediately, since the currently granted token is a Read with Modified token, and the cm_read's read tokens are compatible with this token. However, it is possible that the data being read might be out of date, since there is no guarantee that the latest copy of the data from the remote cluster 12 has made it to the data's home cluster 12. Upon recovery of the network partition, the remote cluster 12 will store any updated data back to the data's home cluster 12. If the cm_read operation is performed while the operating mode is Quick Release, then the read will succeed if and only if the token had been returned before the partition, and will otherwise fail.

Glossary

Cache Appliance—A computer system 10 that caches data from file servers and exports that data using the file system 10 access protocols such as NFS or CIFS.

Cluster—A collection of Cache Appliances that act functionally as a single Cache Appliance in terms of the data returned from requests to the Cache Appliances, but which scale performance linearly, or close to linearly, with the number of Cache Appliances in the cluster.

Home Cluster—In this invention, the cluster with token management responsibility for a set of file servers is said to be the home cluster for data on those file servers, and for exports from those file servers. A home cluster is always interpreted relative to a file server export. Different exports on different servers may have different home clusters.

Remote Cluster—In this invention, a remote cluster is any other cluster than the home cluster. Exports on different file servers will have different remote clusters.

Operating Mode—An administrator-specified policy associated with a file server export that specifies the desired behavior of a distributed collection of Cache Appliance Clusters should the clusters in the collection be separated by network partitions.

Quick Release Mode—An operating mode that allows write-back caching in remote clusters, and which attempts to minimize the size of the window in which a network partition prevents the local cluster from accessing files it is responsible for.

Strict Clustered Mode—An operating mode that always uses write-through caching at remote clusters so that in the event of a network partition, the home cluster for a particular file server can continue to serve data reads and writes from that file server.

Weak Clustered Mode—An operating mode that allows write-back caching at remote clusters, and simultaneously allows reads for files at their home clusters, even in the event of a network partition between the data's accessing cluster and the data's home cluster.

Token—A lock obtained on one node to coordinates its actions with those being performed at the same time to the same file on other nodes. Tokens may be persistent, in which case they survive node reboots, or non-persistent, in which case they are released after a lease expiration time expires if their Token Server crashes. Some persistent tokens change their behavior upon lease expirations, as well.

Data Range Token—A synchronization token or lock that coordinates updates and readers of a portion of the data bytes of a file.

Attribute Token—A synchronization token or lock that coordinates updates and readers of a file's attributes.

WAN—Wide area network. A network spanning a significant distance, typically having high latencies for sending requests from one node to another.

UUID—Universal unique identifier. A 128 bit value generated uniquely that matches no other UUID ever created, on any node.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A system for storing data comprising:
a plurality of clusters located remotely from each other in which the data is stored, each cluster having a token server that issues tokens which provide synchronized concurrent controlled access by the clusters to the data shared by the clusters with only one token server responsible for any piece of data, each cluster having a plurality of Cache appliances, each cluster having at least one backend file server in which the data is stored, each cluster includes a configuration module for managing configuration information of the cluster, each Cache appliance includes a token client module which handles obtaining tokens from multiple clusters, each Cache appliance includes an NFS client module which sends calls to a backend file server in any of the clusters in the network, each Cache appliance includes a Cache manager module which executes a request by obtaining tokens from the token server and accessing Cache attributes and Cache data; and
a communication network through which the servers and appliances communicate with each other, one of the plurality of clusters being a remote cluster that performs operations directly on the data of the backend server of a different one of the plurality of clusters whose token server controls access to the data.

2. The system of claim 1 wherein each Cache appliance includes a Cache-to-Cache (C2C) server module that handles requests from Cache managers of other Cache appliances for data stored in a back end server associated with the Cache appliance.

3. The system of claim 2 wherein each Cache appliance includes a CFS module for storing cached data persistently at the Cache appliance.

4. The system of claim 3 wherein each Cache appliance includes an NFS server module which receives incoming NFS requests for a specific exported file system from any cluster.

5. The system of claim 4 wherein each Cache appliance obtains Leased Write Tokens when getting tokens to perform write operations to data stored at a remote cluster's back-end file server.

6. The system of claim 5 wherein upon expiration of a Leased Token's lease due to a network partition or cache appliance node failure, the leased write token is deleted and remote access to the cached data is prevented until the network partition is repaired.

7. The system of claim 5 where the Cache appliance operates in write-through mode.

8. The system of claim 5 where the choice of which type of write tokens to obtain for data stored in a remote cluster is determined by a setting in the configuration module.

9. The system of claim 4 wherein each Cache appliance obtains Reducible Write Tokens when getting tokens to perform write operations to data stored at a remote cluster's back-end file server.

10. The system of claim 9 wherein upon expiration of the lease associated with a reducible write token, due to a network partition or cache appliance node failure, the token is reduced to a read with modified token protecting the modified data.

11. The system of claim 4 wherein each Cache appliance obtains non-leased Persistent Write Tokens when writing data located at back-end file servers of remote clusters, and where the Cache appliance writes the data back asynchronously to the back-end file server from where the data was originally obtained.

12. A Cache Appliance cluster in which data is stored in back-end servers within each of a plurality of clusters located remotely from each other comprising:
one or more Cache appliances;
one or more back-end file servers;
one or more token servers which manage tokens for the cluster's data shared by the clusters, the token server issues tokens which provide synchronized concurrent controlled accesses to the data by the clusters controlled by these token servers and no other token server of any other cluster, each cluster includes a configuration module for managing configuration information of the cluster, each Cache appliance includes a token client module which handles obtaining tokens from multiple clusters, each Cache appliance includes an NFS client module which sends calls to a backend file server in any of the clusters in the network, each Cache appliance includes a Cache manager module which executes a request by obtaining tokens from the token server and accessing Cache attributes and Cache data; and a configuration database which stores local virtual server definitions, which exports location services to remote clusters, and which associates a local file system export with a remote cluster's export, one of the plurality of clusters being a remote cluster that performs operations directly on the data of the backend server of a different one of the plurality of clusters whose token server controls access to the data.

13. A method for storing data comprising the steps of:
receiving data at a plurality of clusters located remotely from each other, each cluster having a token server that issues tokens which provide synchronized concurrent controlled access by the clusters to the data shared by the clusters with only one token server responsible for any piece of data, each cluster having a plurality of Cache appliances, the servers and appliances communicate with each other through a communication network, each cluster includes a configuration module for managing configuration information of the cluster, each Cache appliance includes a token client module which handles obtaining tokens from multiple clusters, each Cache appliance includes an NFS client module which sends calls to a backend file server in any of the clusters in the network, each Cache appliance includes a Cache manager module which executes a request by obtaining tokens from the token server and accessing Cache attributes and Cache data;
storing the data at one or more backend file servers of each cluster; and
performing operations by one of the plurality of clusters being a remote cluster that performs operations directly on the data of the backend server of a different one of the plurality of clusters whose token server controls access to the data.

14. The method of claim 13 including the step of obtaining tokens from multiple clusters from a token client module of one of the Cache appliances.

15. The method of claim 14 including the step of sending calls to a backend file server in any of the clusters in the network from an NFS client module of a Cache appliance.

* * * * *